Aug. 25, 1964  J. GIBBON  3,146,393
SATURABLE MAGNETIC DEVICE WITH ELLIPTICAL CORE
Original Filed March 28, 1957

INVENTOR.
JOHN GIBBON
BY
ATTORNEY

United States Patent Office 3,146,393
Patented Aug. 25, 1964

3,146,393
SATURABLE MAGNETIC DEVICE WITH
ELLIPTICAL CORE
John Gibbon, Morris Plains, N.J., assignor to Monroe
Calculating Machine Company, Orange, N.J., a corporation of Delaware
Original application Mar. 28, 1957, Ser. No. 649,181.
Divided and this application May 26, 1961, Ser. No. 112,943
1 Claim. (Cl. 323—56)

This invention is a division of copending patent application 649,181, filed March 28, 1957, by John Gibbon.

This invention relates to an improved magnetic bridge-type device and to a method for permanently balancing the bridge of the device. The device is adaptable to be used for signal switching or for sensing a stationary magnetic field.

The coupling between two coils on a magnetic core can be varied by controlling the reluctance of the core. The signal passing from one coil to the other can thus be switched on and off or amplitude modulated by means controlling the reluctance of the core. In many applications for signal switching and selection, it is important that the minimum amount of power be required to effect the control.

The stationary magnetic field across the air gap of a core can be sensed by cycling the reluctance of the core and detecting the flux change in the core resulting from the field. If the cycling is accomplished at a sufficiently high rate, the magnitude sensed will depend on the field strength and will be independent of the rate of change of the field. A magnetic transducer functioning in this manner can sense information recorded on a magnetic medium when the medium is stationary with respect to the transducer. It can also provide an output independent of the speed with which the medium passes the transducer.

In the device of the instant invention, current through a single control coil can produce saturation in the magnetic bridge section of a magnetic core. Saturation of the magnetic bridge section changes the reluctance of the core. When the bridge section is balanced, however, the control current produces no flux in other parts of the core. The invention also includes a novel method for permanently balancing the magnetic bridge section.

The bridge structure of the instant device is such that a minimum of power is required to control the reluctance of the core for signal switching applications. The device can be simply and economically constructed and will remain with a substantially permanent balance after processing in accordance with the method of the invention. Only a single coil is required for control of core reluctance.

An object of the invention is an improved means for dynamically controlling the reluctance of a magnetic core for signal switching or magnetic transducing applications.

A further object of the invention is a method of permanently balancing magnetic bridge-type devices.

A still further object of the invention is an improved magnetic bridge-type device for sensing information recorded on a magnetic medium.

A yet further object of the invention is an improved magnetic bridge-type device for signal switching.

Other objects and a fuller understanding of the invention may be had by referring to the following description and claim, taken in conjunction with the accompanying drawings in which:

Figure 1:
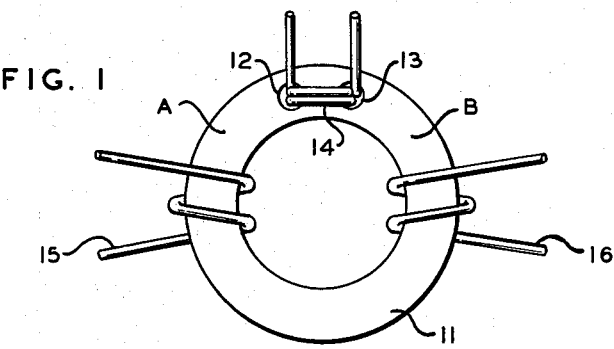
FIG. 1 is a plan view of an embodiment of the invention for controlling the coupling between two circuits.

Referring now to FIG. 1, core 11 is composed of a magnetic material that is in the shape of a toroid to provide a closed path for the flow of magnetic flux. Holes 12 and 13 extend through the center of adjacent cross sections on core 11 and are parallel to each other. Coil 14 is wound around the section of core 11 between holes 12 and 13 by passing opposite sides of each winding through holes 12 and 13. Coils 15 and 16 are wound around other sections of core 11 in a conventional manner.

Current through coil 14 will produce magnetic flux in core 11 that will flow locally around holes 12 and 13 in opposite directions. If the reluctance of the path of flux around hole 12 is symmetrical with respect to that around hole 13, the magnetomotive forces exerted at points A and B on opposite sides of holes 12 and 13 will be equal. The flux produced by current through coil 14 will then be restricted to the section of core 11 around holes 12 and 13 and will not flow around the main flux path of core 11. Change of current through coil 14 will thus not induce any voltage in coils 15 and 16.

If the sections of core 11 adjacent to holes 12 and 13 are unsaturated, current through coil 15 or coil 16 will produce a magnetic flux around core 11 past holes 12 and 13. A signal applied to coil 15 will thus be inductively coupled to coil 16 or vice versa. If the section of core 11 adjacent to holes 12 and 13 is saturated, however, the reluctance will be higher and little or no flux will be produced around core 11 by current through coil 15 or coil 16. Coils 15 and 16 will then not be inductively linked sufficiently for signals to pass from one to the other.

Flux around core 11 must flow past either or both sides of holes 12 and 13. On either side, heavy current in coil 14 will cause the part of the path adjacent to hole 12 to be saturated in one direction and the part of the path adjacent to hole 13 to be saturated in the opposite direction. On one side of holes 12 and 13, magnetomotive force produced by current through coil 15 or coil 16 will aid the saturation adjacent to hole 12 and oppose it adjacent to hole 13. On the other side of holes 12 and 13, the magnetomotive force will oppose saturation adjacent to hole 12 and aid it adjacent to hole 13.

Magnetomotive force produced by current through coil 15 or coil 16 will thus tend to drive a part of core 11 along either side further into saturation. As a part of the flux path will always be driven further into saturation by a signal applied to coil 15 or 16, less power is required to be applied to coil 14 to maintain a high reluctance around core 11. This is an improvement over conventional magnetic bridge arrangements in which the control current must be strong enough to maintain saturation in opposition to the magnetomotive force produced by the signal being handled.

Figure 2:
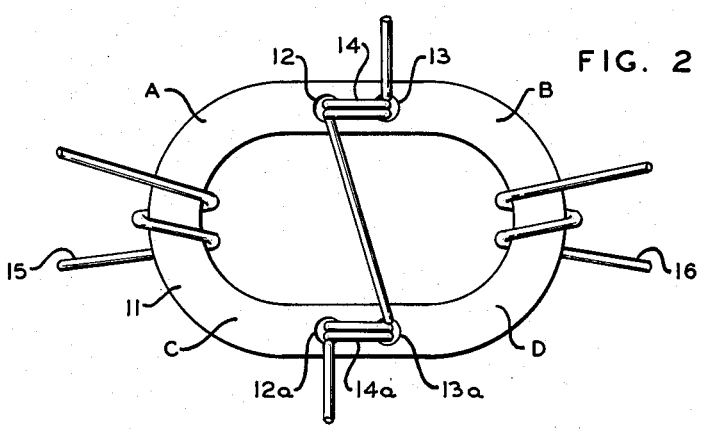
FIG. 2 is a plan view of a modification to the embodiment of FIG. 1.

Referring now to FIG. 2, the device of FIG. 1 can be modified by making core 11 more elliptical in form and adding coil 14a and holes 12a and 13a. Holes 12 and 13 are located on one of the longer sides of core 11 and holes 12a and 13a on the other. Coil 14a is wound through holes 12a and 13a in the same manner as coil 14 is wound through holes 12 and 13 and is connected in series with coil 14. Current through coil 14a produces the same effect in the section of core 11 around holes 12a and 12a as does current through coil 14 around holes 12 and 13.

Current through coils 14 and 14a thus increases the reluctance of two sections of core 11. With these sections saturated, they may be considered as substantially equivalent to air gaps at these locations. There will be some flux leakage across or around these areas when a magnetomotive force is produced by current through coil 15 or coil 16. The same was true across the section adjacent to holes 12 and 13 in the device of FIG. 1. The relative amount of leakage flux determines the minimum coupling that is obtainable between coils 15 and 16.

In the device of FIG. 2, the leakage will be less than in the device of FIG. 1 if the sections are of equivalent size. This is due in part to the fact that the two sections or gaps essentially in series have a higher total reluctance and in part to the fact that a shunting leakage path is provided. When current flows through coil 15, opposite magnetic polarities are produced in core 11 at point A adjacent to hole 12 and at point C adjacent to hole 12a. Leakage flux can flow through the air gap between points A and C or across the two sections around holes 12, 13, 12a and 13a and through the part of core 11 on which coil 16 is located.

Only the leakage flux taking the latter path will be effective in inducing a voltage in coil 16. If the reluctance of the path between points A and C is made lower than this latter path, most of the leakage flux will bypass coil 16. The distance, and so the reluctance, between points A and C is reduced by making core 11 in elliptical form or some other suitable shape. The minimum coupling between coils 15 and 16 in the device of FIG. 2 can then be made a fraction of that in the device of FIG. 1. The device of FIG. 2 is thus more suitable where an extremely high signal rejection ratio is desirable.

Figure 3:
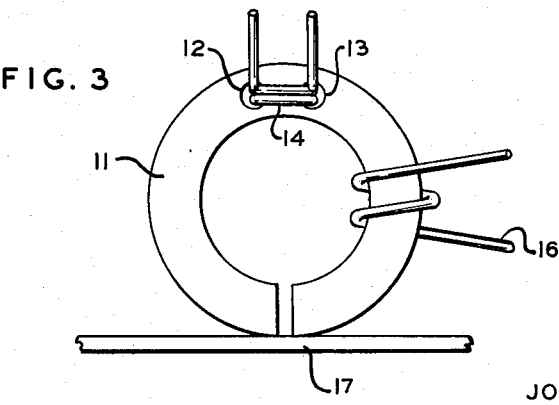
FIG. 3 is a plan view of another embodiment of the invention for use as a magnetic transducer to play back information from a stationary magnetic record or from magnetic records moving at varying speeds.

Referring now to FIG. 3, the device is modified to serve as a magnetic transducer by cutting a gap in core 11 through a section opposite to holes 12 and 13. Coil 15 is removed and core 11 is located with the gap adjacent to a magnetic recording medium 17. Information recorded on magnetic medium 17 adjacent to the gap will produce a magnetomotive force around core 11. The resulting flux will depend on the reluctance of core 11 and so on the degree of saturation of the sections adjacent to holes 12 and 13. If an alternating current is applied to coil 14, the reluctance will vary cylically and so can periodically change the flux around core 11 from a substantially zero value to a value dependent on the strength of the field on record medium 17. The change of flux will induce a voltage across coil 16 corresponding to the strength of the field on the record medium.

Information recorded on medium 17 can thus be sensed even though medium 17 is not moving with respect to core 11. If the current alterations applied to coil 14 are more rapid than the variations in the magnetic field near the gap, the output across coil 16 will be dependent on the field strength and not on its rate of change. A substantially constant amplitude for a given recorded signal can thus be obtained independently of the speed with which medium 17 is moved past core 11.

In the devices of FIG. 1, FIG. 2, and FIG. 3, it is desirable that the magnetic circuits around holes 12 and 13 and around holes 12a and 13a be balanced so that changes occurring in coil 14 will not induce voltages across any other coil on core 11. As coil 14 produces equal magnetomotive forces around holes 12 and 13, an electrical adjustment can not be made to compensate for variations in the dimensions and characteristics of core 11 when economically manufactured. The magnetic circuits can, however, be permanently balanced by the following method.

After fabrication, an alternating current is applied to coil 14 and a voltage measuring device connected to coil 16. Sections of core 11, adjacent to hole 12 or hole 13, are then ground until the voltage induced across coil 16 is reduced to zero to indicate a perfect balance. The phase of the voltage induced across coil 16 indicates the direction of unbalance and so the location on core 11 which should be ground for removal of material.

Although the invention has been described with a certain degree of particularity, it is understood that the present disclosure has been made only by way of example and that numerous changes in the details of construction and the combination and arrangements of parts may be resorted to without departing from the spirit and scope of the invention as hereinafter claimed.

What is claimed is:

A coupling device comprising an elliptical magnetic core having a pair of adjacent holes therethrough along each of the two longer arcs, a control winding through both pairs of holes, means for applying a voltage to the said control winding to thereby saturate two portions of the core, an input winding surrounding a portion of the elliptical core proximate one of the shorter elliptical arcs and an output winding surrounding a portion of the elliptical core proximate the other shorter elliptical arc whereby the magnetic flux coupling between the input and output windings is affected by the elliptical shape of the core and the degree of core saturation resulting from the current flow through the control winding.

References Cited in the file of this patent

UNITED STATES PATENTS

| | | |
|---|---|---|
| 2,846,673 | Gray | Aug. 5, 1958 |
| 2,902,676 | Brown | Sept. 1, 1959 |
| 2,990,521 | Tominaga | June 27, 1961 |